United States Patent [19]

Lee et al.

[11] Patent Number: 5,381,673
[45] Date of Patent: Jan. 17, 1995

[54] ABSORPTION COOLING DEVICE

[75] Inventors: Seung-Gap Lee, Suwon; Sung-Ho Gil, Gwacheon; Suk-Hyun Eun; Hong-Won Lee, both of Seoul, all of Rep. of Korea

[73] Assignee: Samsung Electronics Co., Ltd., Suwon, Rep. of Korea

[21] Appl. No.: 145,222

[22] Filed: Nov. 3, 1993

[30] Foreign Application Priority Data

Nov. 3, 1992 [KR] Rep. of Korea ............... 1992-20549

[51] Int. Cl.$^6$ .............................................. F25B 15/00
[52] U.S. Cl. ........................................ 62/483; 62/484
[58] Field of Search ................... 62/476, 483, 484, 494

[56] References Cited

U.S. PATENT DOCUMENTS

| | | | |
|---|---|---|---|
| 1,678,277 | 7/1928 | Von Platen et al. | 62/484 |
| 3,038,320 | 6/1962 | English et al. | 62/494 |
| 3,210,057 | 10/1965 | Deady et al. | 62/494 |
| 3,266,267 | 8/1966 | Merrick et al. | 62/476 |
| 3,369,373 | 2/1968 | Merrick | 62/476 |
| 3,424,951 | 1/1969 | Eisberg | 62/494 |
| 5,237,839 | 8/1993 | Dehne | 62/476 |

FOREIGN PATENT DOCUMENTS 3294768 12/1991 Japan.

Primary Examiner—Henry A. Bennet
Assistant Examiner—William C. Doerrles
Attorney, Agent, or Firm—Burns, Doane, Swecker & Mathis

[57] ABSTRACT

In an absorption cooling system, a refrigerant condensate is converted to a refrigerant gas in an evaporator to achieve a cooling effect. The refrigerant gas is then converted into smaller bubbles in an inlet chamber of an absorber, and a mixture of those bubbles and lithium bromide solution is raised through a heat-exchange conduit to an outlet chamber of the absorber to cause the refrigerant gas to be absorbed by the lithium bromide. The lithium bromide which is diluted by the refrigerant gas is fed to a generator which separates the refrigerant from the lithium bromide. Residual refrigerant gas in the out let chamber of the absorber is returned to the inlet chamber.

9 Claims, 4 Drawing Sheets

ABSORPTION COOLING DEVICE

BACKGROUND OF THE INVENTION

1. Field of the Invention

The present invention relates to an absorption cooling device for generating a cooling output by using a refrigerant gas and a lithium bromide.

2. Description of the Prior Art

Referring to FIG. 1, a conventional absorption cooling device is illustrated which generates a cooling output by using a refrigerant gas and a lithium bromide. As shown in FIG. 1, the absorption cooling device includes a generator 1 for separating a refrigerant gas and a concentrated solution from a dilute solution by a heat generated from a burner. The refrigerant gas separated by the generator 1 is condensed by a condenser 3. An evaporator 5 is also provided which serves to evaporate the refrigerant gas condensed in the condenser 3 and thereby generate a cooling output. The absorption cooling device further includes an absorber 7 for changing the refrigerant gas into a dilute solution.

The absorber 7 includes an upper chamber 9 having a space for storing the refrigerant gas fed from the evaporator 5 and the concentrated solution fed from the generator 1. A heat transfer Pipe 11 is connected at one end thereof to the upper chamber 9. The heat transfer pipe 11 defines a passage permitting the refrigerant gas and the concentrated solution to be naturally dropped so that the refrigerant gas is absorbed in the concentrated solution during the dropping. A plurality of heat discharging fins 12 are fixedly mounted to the outer wall surface of the heat transfer pipe 11 and adapted to outwardly discharge heat generated when the refrigerant gas is changed into a dilute solution. To the other end of the heat transfer pipe 11, a lower chamber 10 is connected which has a space for storing the dilute solution produced in the heat transfer pipe 11. A pump f is also provided which generates a power for feeding the dilute solution stored in the lower chamber 10 to the generator 1.

In the conventional absorption cooling device having the above-mentioned construction, the refrigerant gas fed from the evaporator 5 and the concentrated solution fed from the generator 1 are naturally dropped through the heat transfer pipe 11. During the dropping, the refrigerant gas is absorbed in the concentrated solution, thereby forming a dilute solution.

However, the refrigerant gas is in insufficient contact with the concentrated solution in the heat transfer pipe 11 because they are dropped at the same velocity. As a result, the refrigerant gas is insufficiently absorbed in the concentrated solution. This results in a degradation in absorption efficiency of the absorber and thus a degradation in cooling efficiency of the absorption cooling device.

Various types of absorption cooling devices have been proposed for solving the above-mentioned problem.

One example of such conventional absorption cooling devices is disclosed in Japanese Patent Laid-open Publication No. Heisei 3-294768 filed on Apr. 11, 1990 and published on Dec. 25, 1991.

As shown in FIG. 2, the absorption cooling device disclosed in Japanese Patent Laid-open Publication No. Heisei 3-294768 includes an upper chamber 33 having a refrigerant gas inlet 32, a lower chamber 37 having a dilute solution outlet 36, and a heat transfer pipe 40 connected between the upper chamber 33 and the lower chamber 37 and adapted to pass a dilute solution therethrough. A plurality of fins 39 are fixed to the outer surface of the heat transfer pipe 40. The upper chamber 33 is provided at the interior thereof with a concentrated solution supply pipe 41 and an injection nozzle 42 for injecting the concentrated solution into the concentrated solution supply pipe 41.

In the conventional absorption cooling device having the above-mentioned construction, the refrigerant gas fed from an evaporator is absorbed in the concentrated solution injected into the upper chamber 33 by the injection nozzle 42 and thereby changed into a dilute solution which is, in turn, naturally dropped into the heat transfer pipe 40.

In other words, this absorption cooling device is adapted to absorb the refrigerant gas in the concentrated solution in the upper chamber 33 and change it into the dilute solution. In the absorption cooling device, however, even the refrigerant gas portion not absorbed in the concentrated solution is naturally dropped through the heat transfer pipe 40. As a result, the absorption of the refrigerant solution in the concentrated solution is inefficiently achieved. Such an inefficient absorption results in a degradation in absorption efficiency of the absorber and thus a degradation in cooling efficiency of the absorption cooling device.

SUMMARY OF THE INVENTION

Therefore the present invention has been made in view of the above-mentioned problems encountered in the prior arts and an object of the invention is to provide an absorption cooling device capable of more efficiently absorbing a refrigerant gas fed from an evaporator in a concentrated solution fed from a generator, thereby improving an absorption efficiency and thus a cooling efficiency.

In accordance with the present invention, this object can be accomplished by providing an absorption cooling device comprising a generator for separating a dilute solution into a refrigerant gas and a concentrated solution, a condenser for condensing said refrigerant gas fed from said generator, and an evaporator for generating a cooling output from the refrigerant gas fed from said condenser, said device further comprising: an absorber connected between said generator and said evaporator and adapted to receive said refrigerant gas fed from the evaporator and said concentrated solution fed from the generator, raise the refrigerant gas and the concentrated solution through a passage, and absorb the refrigerant gas in the concentrated solution during the rising thereof to produce a dilute solution; and pumping means for generating a pumping force for raising the refrigerant gas and the concentrated solution fed to said absorber.

In the absorption cooling device, the concentrated solution fed from the generator and the refrigerant gas fed from the evaporator are raised through a heat transfer pipe of the absorber by the pump so that the refrigerant gas is more easily absorbed in the concentrated solution during the rising thereof. As a result, the absorption efficiency of the absorber is improved. Thus the absorption cooling device exhibits an improved cooling efficiency.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
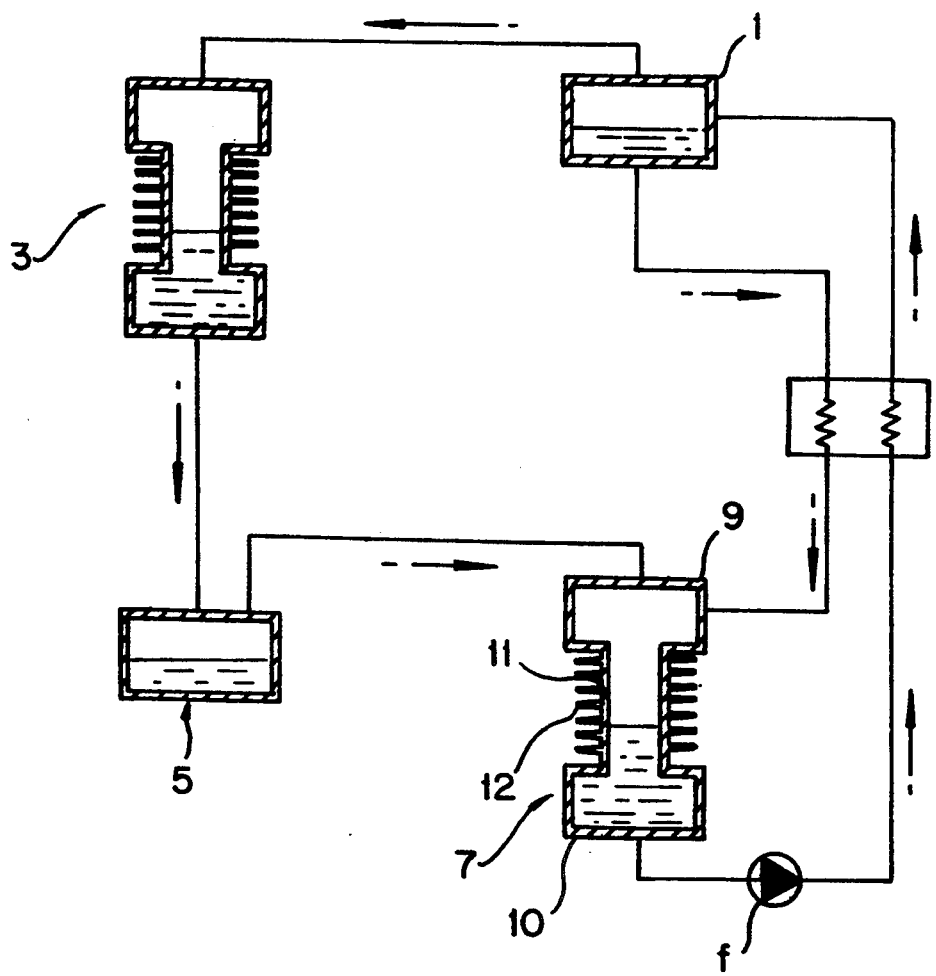
FIG. 1 is a schematic view of the overall system of a conventional absorption cooling device.
Figure 2:
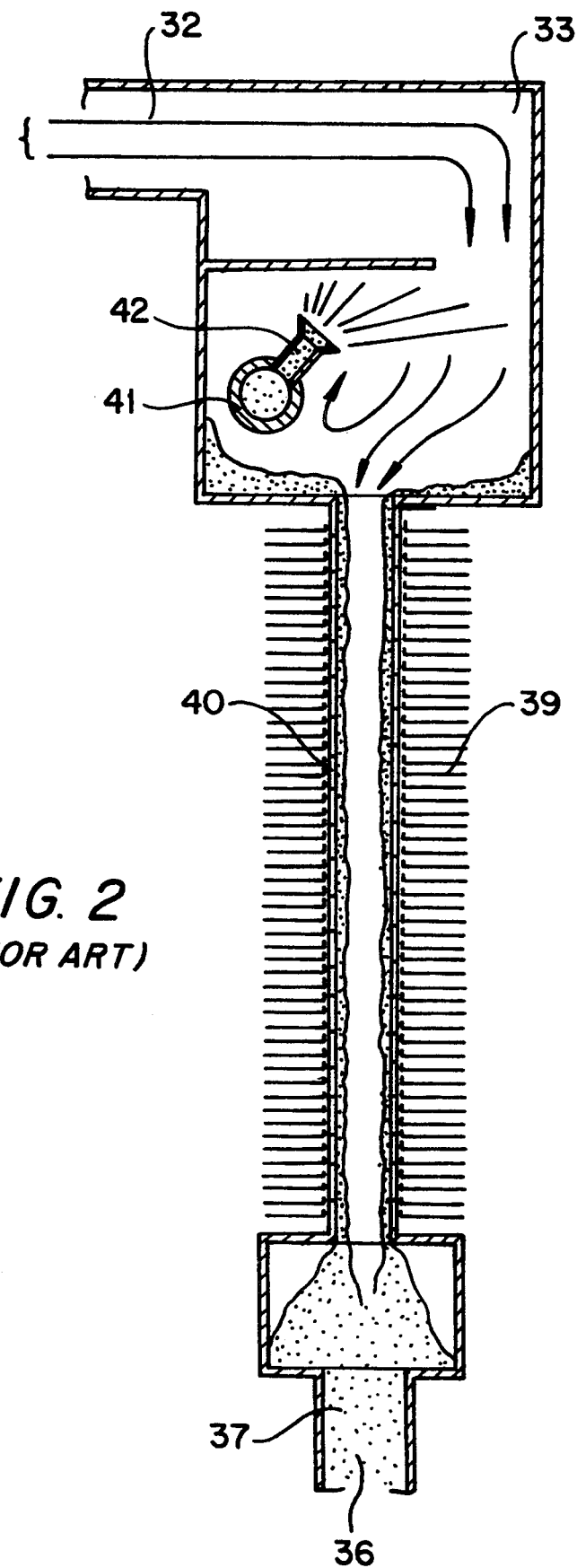
FIG. 2 is a sectional view of an absorber employed in the conventional absorption cooling device in accordance with the prior art.
Figure 3:
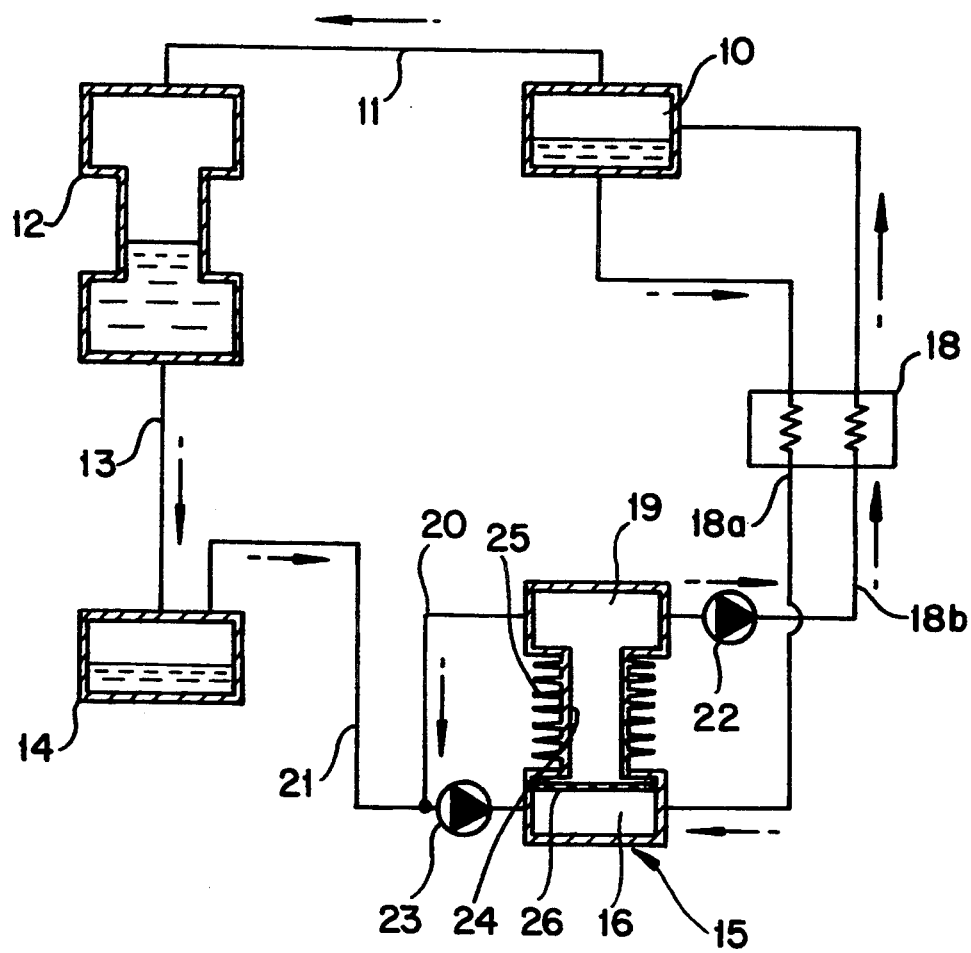
FIG. 3 is a schematic view of the overall system of an absorption cooling device in accordance with the present invention.
Figure 4:
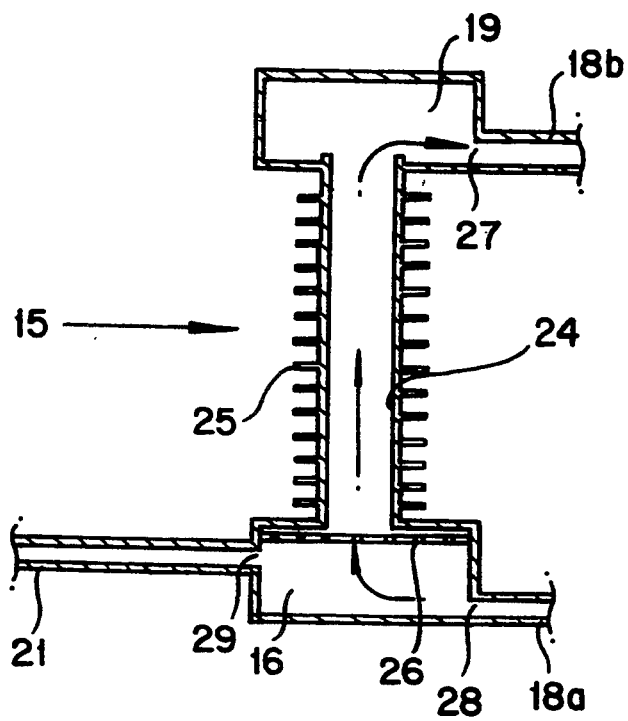
FIG. 4 is a sectional view of an absorber employed in the absorption cooling device in accordance with a first embodiment of the present invention.

In FIGS. 3 and 4, the reference numeral 10 denotes a generator adapted to separate a dilute solution fed from an absorber, which will be described hereinafter, into a concentrated solution and a refrigerant gas by a heat generated from a burner not shown.

The reference numeral 12 denotes a condenser adapted to condense the refrigerant gas separated by the generator 10. Between the condenser 12 and the generator 10, a first connecting member 11 is connected which serves to guide the refrigerant gas to the condenser 12.

The reference numeral 12 denotes an evaporator for evaporating the refrigerant gas concentrated by the condenser 12 and thereby generating a cooling output. A second connecting member 13 is connected between the condenser 12 and the evaporator 14. The second connecting member 13 serves to guide the refrigerant gas condensed by the condenser 12 to the evaporator 14.

On the other hand, the reference numeral 15 denotes an absorber for absorbing the refrigerant gas fed from the evaporator 14 in the concentrated solution fed from thee generator 10 and thereby changing it into a dilute solution. The absorber 15 includes a lower chamber 16 defining a space for receiving the refrigerant gas and the concentrated solution. The lower chamber 16 has a concentrated solution inlet 28 for introducing the concentrated solution fed from the generator 10, and a refrigerant gas inlet 29 for introducing the refrigerant gas fed from the evaporator 14 in the absorber 15. The absorber 15 further includes a heat transfer pipe 24 connected at one end thereof to the lower chamber 16. The heat transfer pipe 24 defines a passage for raising the refrigerant gas and the concentrated solution from the lower chamber 16 by a pumping force of a pump, which will be described hereinafter and absorbing the refrigerant gas in the concentrated solution during the rising thereof to change it into a dilute solution. An upper chamber 19 is connected to the other end of the heat transfer pipe 24. The upper chamber 19 has a dilute solution outlet 27 for discharging the dilute solution produced in the heat transfer pipe 24 into the generator 10.

In the lower chamber 16, a bubble formation member 26 having a plurality of very small ports arranged in the form of a honeycomb is disposed which serves to form very small bubbles of the refrigerant gas so that the refrigerant gas fed from the evaporator 14 can be more easily absorbed in the concentrated solution fed from the generator 10.

Since the bubble formation member 26 having the very small ports is disposed in the lower chamber 16, the refrigerant gas passing through the bubble formation member 26 in the lower chamber 16 forms very small bubbles. As a result, an increased amount of the refrigerant gas can be absorbed in the concentrated solution.

A plurality of spaced heat discharging fins 25 are fixed to the outer wall of the heat transfer pipe 24 of the absorber 15 so as to outwardly discharge a heat generated upon absorbing the refrigerant gas in the concentrated solution during the rising thereof through the heat transfer pipe 24.

A third connection member 21 is connected between the evaporator 14 and the lower chamber 16 of the absorber 15. The third connection member 21 serves to guide the refrigerant gas from the evaporator 14 to the lower chamber 16 of the absorber 15.

Between the concentrated solution inlet 28 of the lower chamber 16 arid the generator 10, a fourth connection member 18a is connected which serves to guide the concentrated solution separated in the generator 10 to the lower chamber 16. A fifth connection member 18b is also connected between the dilute outlet 27 of the upper chamber 19 and the generator 10. The fifth connection member 18b guides the dilute solution from the upper chamber 19 to the generator 10.

A pump 22 is disposed in the fifth connection member 18b between the upper chamber 19 and the generator 10. The pump 22 generates a pumping force for raising the refrigerant gas and the concentrated solution contained in the lower chamber 16 through the heat transfer pipe 24 and feeding the dilute solution produced in the heat transfer pipe 24 to the generator 10.

On the other hand, the reference numeral 18 denotes a heat exchanger which serves to perform a heat exchange between the concentrated solution passing through the fourth connection member 18a and the dilute solution passing through the fifth connection member 18b.

Operation of the absorption cooling device having the above-mentioned construction in accordance with the first embodiment of the present invention will now be described.

A dilute solution fed to the generator 10 via the fifth connection member 18b is heated by a heat generated from a burner not shown so that it is separated into a refrigerant gas and a concentrated solution.

The refrigerant gas separated in the generator 10 is fed to the condenser 12 via the first connection member 11 and then condensed by the condenser 12.

The condensed refrigerant gas from the condenser 12 is fed to the evaporator 14 via the second connection member 13 and then evaporated by the evaporator 14, thereby generating a cooling output.

On the other hand, the concentrated solution separated in the generator 10 is fed to the lower chamber 16 of the absorber 15 in which the refrigerant gas from the evaporator 14 is supplied.

The refrigerant gas and the concentrated solution supplied in the lower chamber 16 are fed to and raised through the heat transfer pipe 24 by a pumping force of the pump disposed in the fifth connection member 18b.

At this time, the rising refrigerant gas is absorbed in the rising concentrated solution in the heat transfer pipe 24 to produce a dilute solution. The produced dilute solution is fed to the generator 10 via the fifth connection member 18b.

The absorption of the refrigerant gas in the concentrated solution is enhanced because the refrigerant gas passing through the heat transfer pipe 24 has been changed into very small bubbles.

In other words, an increased amount of the rising refrigerant gas having the form of very small bubbles is absorbed in the rising concentrated solution in the heat transfer pipe 24 to produce a dilute solution having a lower concentration of lithium bromide.

As the dilute solution of the lower concentration is fed to the generator 10, an increased amount of refrigerant gas is separated from the dilute solution in the generator 10, thereby enabling the amount of refrigerant gas condensed in the condenser 12 to be increased. As the increased amount of condensed refrigerant gas is evaporated in the evaporator 14, an increased cooling output can be obtained. Thus the cooling efficiency of the cooling device is improved.

Figure 5:
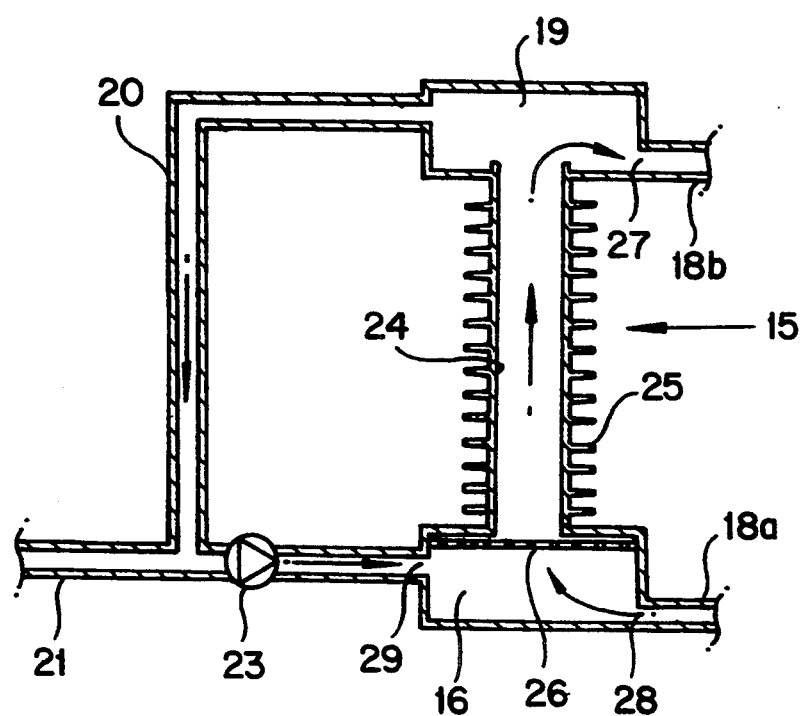
FIG. 5 is a sectional view of an absorber employed in the absorption cooling device in accordance with a second embodiment of the present invention.

FIG. 5 is a sectional view of an absorber employed in the absorption cooling device in accordance with a second embodiment of the present invention. The absorber of the second embodiment is similar to that of the first embodiment, except that a refrigerant gas remaining in the upper chamber 19 is fed back to the lower chamber 16 by a bypass member 20 and a gas pump 23.

In accordance with this embodiment, the bypass member 20 is connected between the upper chamber 19 and the third connection member 21 so as to guide a refrigerant gas remaining in the upper chamber 19 to the third connection member 21. The gas pump 23 is disposed in the third connection member 21. The gas pump 23 generates a pumping force for feeding back the refrigerant gas remaining the upper chamber 19 to the lower chamber 16 via the bypass member 20.

The bypass member 20 has an inlet positioned at a level higher than that of the dilute solution outlet 27 so that the refrigerant gas remaining in the upper chamber 19 can be easily fed back to the lower chamber 16.

The gas pump 23 is constructed to generate a pumping force insufficient to pump a liquid such as the dilute solution stored in the upper chamber 19, but sufficient to pump a gas such as the refrigerant gas. With this construction, a larger amount of the refrigerant gas can be supplied in the absorber 15. Thus the absorption efficiency of the absorber is improved.

As apparent front the above description, the present invention provides an absorption cooling device including an absorber capable of efficiently absorbing an increased amount of refrigerant gas in a concentrated solution, thereby improving an absorption efficiency. By the improved absorption efficiency of the absorber, the absorption cooling device exhibits an improved cooling efficiency.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An absorption cooling apparatus comprising:
a fluid-conducting circuit;
generating means mounted in said circuit for separating a dilute solution into a refrigerant gas and a concentrated solution of refrigerant-absorbing liquid;
condensing means mounted in said circuit for receiving refrigerant gas from the generating means and condensing the refrigerant gas into a condensate;
evaporating means mounted in said circuit for receiving condensate from the condensing means and transforming the condensate into a refrigerant gas to produce a cooling effect;
absorbing means mounted in said circuit and comprising an inlet section, and an outlet section disposed above the inlet section, the inlet section arranged to receive refrigerant gas from the evaporating means, and concentrated refrigerant-absorbing solution from the generating means; and
a pump member mounted in said circuit for inducing an upward flow of a mixture of the refrigerant gas and the concentrated refrigerant-absorbing solution from the inlet section to the outlet section so that the refrigerant gas is absorbed by the concentrated refrigerant absorbing solution to form a dilute solution, said inlet section including converting means through which the pumped mixture is forced for converting the refrigerant gas into smaller bubbles to facilitate absorption thereof into the refrigerant-absorbing solution.

2. An absorption cooling apparatus according to claim 1, wherein the means for converting the refrigerant gas into smaller bubbles comprises a perforated plate through which the mixture passes.

3. An absorption cooling apparatus according to claim 1 including a bypass member interconnecting the inlet and outlet sections for returning to the inlet section residual refrigerant gas from the outlet section.

4. An absorption cooling apparatus according to claim 3 wherein the bypass member has an inlet disposed at the outlet section at an elevation above an outlet of the outlet section.

5. An absorption cooling apparatus according to claim 2 wherein said converting means comprises a plate with a honeycomb fluid passage arrangement.

6. An absorption cooling apparatus according to claim 1 wherein said pump member is disposed in a portion of said circuit which conducts dilute solution away from the outlet section.

7. An absorption cooling apparatus according to claim 6 wherein said pump member constitutes a first pump member, said apparatus further comprising a second pump member disposed in a portion of said circuit which conducts refrigerant gas to the inlet section.

8. An absorption cooling apparatus according to claim 1 wherein said pump member constitutes a first pump member, said apparatus further comprising a second pump member disposed in a portion of said circuit which conducts refrigerant gas to the inlet section.

9. An absorption cooling apparatus according to claim 8 wherein said converting means comprises a plate with a honeycomb fluid passage arrangement.

* * * * *